(12) United States Patent
O'Toole, Jr. et al.

(10) Patent No.: US 7,673,048 B1
(45) Date of Patent: Mar. 2, 2010

(54) METHODS AND APPARATUS FOR ESTABLISHING A COMPUTERIZED DEVICE TUNNEL CONNECTION

(75) Inventors: James W. O'Toole, Jr., Somerville, MA (US); William Mark Townsley, Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 1157 days.

(21) Appl. No.: 10/373,274

(22) Filed: Feb. 24, 2003

(51) Int. Cl.
*G06F 15/173* (2006.01)
*G06F 15/16* (2006.01)
*H04L 12/26* (2006.01)

(52) U.S. Cl. .................... 709/226; 709/223; 709/227; 709/232; 709/238; 370/229; 370/237

(58) Field of Classification Search ......... 709/238–242, 709/223–230, 234–235; 370/237, 229
See application file for complete search history.

(56) References Cited

U.S. PATENT DOCUMENTS

| | | | |
|---|---|---|---|
| 6,205,488 B1 | 3/2001 | Casey et al. | 709/238 |
| 6,327,358 B1 * | 12/2001 | March et al. | 379/221.01 |
| 6,665,273 B1 * | 12/2003 | Goguen et al. | 370/252 |
| 6,701,437 B1 | 3/2004 | Hoke et al. | 713/201 |
| 6,704,282 B1 * | 3/2004 | Sun et al. | 370/237 |
| 6,917,592 B1 * | 7/2005 | Ramankutty et al. | 370/237 |
| 7,036,143 B1 * | 4/2006 | Leung et al. | 726/15 |
| 7,269,135 B2 * | 9/2007 | Frick et al. | 370/228 |
| 7,283,561 B1 * | 10/2007 | Picher-Dempsey | 370/468 |
| 2001/0055300 A1 * | 12/2001 | Chen | 370/352 |
| 2003/0088698 A1 * | 5/2003 | Singh et al. | 709/239 |
| 2003/0210693 A1 * | 11/2003 | Grabner et al. | 370/392 |

OTHER PUBLICATIONS

"VPN—Virtual private Networking, an overview", Jan. 5, 2002 http://web.archive.org/web/20020105235131/http://homenethelp.com/vpn/.*
Hall, E., "Hide & Seek With Gateways & Translators", <www.ehsco.com/reading/1997021ncwl.htrnl>, Visited Nov. 12, 2002, pp. 1-5.
Townsley, W., et al.,"Layer Two Tunneling Protocol L2TP", www.ietf.org/rfc/rfc2661.txt, Visited Nov. 11, 2002, pp. 1-75.

* cited by examiner

*Primary Examiner*—Nathan Flynn
*Assistant Examiner*—Joshua Joo
(74) *Attorney, Agent, or Firm*—Patterson & Sheridan, LLP (57) ABSTRACT

A client device establishes a first tunnel connection or tunnel, through a public network, with a first gateway of a private network and establishes, through the tunnel connection, a data connection with a destination device within the private network. The first gateway monitors or analyzes the geographic locations of the gateways associated with the private network relative to geographic location of the destination device associated with the data connection. Based upon such the monitoring, the first gateway transmits information to the client device relating to establishment of a second tunnel connection or tunnel with a second gateway of the private network. The client device establishes the second tunnel connection with the second gateway and establishes a data connection with the destination device through the second gateway. By establishing the second tunnel connection with the second gateway, the client device utilizes the bandwidth of the public network to exchange data with the destination device, thereby decreasing data transmission costs to the private network and decreasing private network latency.

12 Claims, 8 Drawing Sheets

METHODS AND APPARATUS FOR ESTABLISHING A COMPUTERIZED DEVICE TUNNEL CONNECTION

BACKGROUND OF THE INVENTION

A computer network, such as the Internet, allows users operating client computer systems to transmit data to and receive data from one or more sites or servers across the network. One conventional form of data transmission involves the use of a virtual private network (VPN) within the computer network. One type of VPN involves a private network constructed using a public network infrastructure (e.g., the Internet) to securely connect divergent network nodes (e.g., remote sites or users). Instead of using a dedicated, physical connection, such as a leased line, a VPN uses "virtual" connections routed from, for example, a company's private central network through a public network (e.g., the Internet) to a remote site or to a remote employee on the road or working from home. Such "virtual" connections are formed in a process known as tunneling. Such VPN's are conventionally constructed to operate over a public network through the use of a combination of data encapsulation, data encryption, and user authentication.

One conventional utilization of a VPN involves a client application at a remote site, such as a software client application installed on a remote computer, establishing a connection to a central site, such as a corporate network. To establish a VPN connection to a corporate network, a user operating the client software selects a gateway from a list of VPN gateways associated with the corporate network. Conventionally, the user bases such a selection upon a "best guess" approach. For example, assume a user is geographically located in Paris, France and can access his corporate network using the client to connect through VPN gateways (e.g., as provided in a list by the client) located in Paris, Amsterdam, or San Jose, Calif. Based upon the "best guess" approach, the user can operate the client to select the gateway geographically closest to his location (e.g., the Paris VPN gateway) for establishment of a tunnel through the public network. The software client application, as a result, connects the client computer to the VPN gateway (e.g., a concentrator of a corporate network) via a telephone connection or an Internet Service Provider connection to the Internet. The VPN software client establishes a secure, encrypted tunnel from the client device to the VPN gateway through the Internet. The gateway then controls access and authorization to the private network.

SUMMARY OF THE INVENTION

Conventional techniques that provide for user selection of a virtual private network gateway suffer from a variety of deficiencies. As described above, for example, in conventional systems, a user selects a VPN gateway from a number of available gateways to establish a connection with a corporate network based upon the geographic proximity between the user and the selected gateway. In such conventional systems, however, the user minimizes the bandwidth utilization of the public Internet connection between the user's computerized device and the VPN gateway when the user selects the VPN gateway geographically closest to the user. In the case where the user requests content that is located within the corporate network or initiates a communication transaction within the corporate network and not within the topographical network proximity (e.g., Layer 1 proximity) of the selected gateway, the selected gateway directs or forwards the request through the corporate network to the appropriate destination within the corporate network. For example, assume the user is located in Paris, France and selects, from a list of available gateways (e.g., Paris, Amsterdam, San Jose), the Paris gateway to access the private corporate network. If, however, the user thereafter requests content located on a corporate network server located in San Jose (e.g., initiates a communication transaction with a receiver in San Jose), the gateway located in Paris directs the content request to the server or other destination device located in San Jose through the corporate network. The Paris gateway, in turn, receives content from the San Jose server over the corporate network and transmits the content, through the established VPN tunnel on to the public network back to the client. In such a case, the user maximizes the consumed bandwidth within the corporate network, thereby increasing the cost of data distribution or transmission to the corporation. In some case, selection of a VPN gateway close to the client can also increase the latency of the connection, as experienced by the user.

By contrast, embodiments of the present invention significantly overcome such deficiencies and provide methods and apparatuses for load balancing tunnels to a private network to maximize data transmission performance while also endeavoring to reduce traffic transmission burden (and associated cost) within the private network. Generally, in operation, a client device establishes an initial or first tunnel or tunnel connection (e.g., a VPN connection), through a public network, with a first gateway (e.g., a VPN gateway) of a private network and establishes, through the tunnel, a data connection with a destination device within the private network. The first gateway monitors, analyzes, or otherwise has knowledge of the geographic locations of the gateways associated with the private network relative to the geographic location of the destination device associated with the data connection. Based upon such monitoring, the first gateway transmits information to the client device relating to establishment of a second tunnel with a second or preferred gateway of the private network. The client device then establishes the second tunnel connection (e.g., a VPN tunnel) with the second gateway and establishes a data connection with the destination device through the second gateway. By establishing the second tunnel connection with the second gateway, the client device utilizes the bandwidth of the public network to exchange data with the destination device, thereby decreasing data transmission burden and associated costs to the private network and potentially improving performance of the connection depending on the characteristics of the public and private portion of traffic traversal.

In other words, in conventional VPN systems, a user is often presented with a list of various VPN gateways that that user may select to connect to a corporate network and the user often chooses the VPN gateway that is physically closest to the user. This is due in part to the intuitive nature of users who feel compelled to couple to the corporate network at the closest point possible to the relative location of that user to either minimize connection costs (e.g., to avoid long distance charges if dialing in) or to minimize security risks of having to couple to the corporate network via a gateway remotely located from the user. Embodiments of the invention operate to optimize the overall total network path for communications between the client device and the destination (via the gateway) through the use of different gateways (e.g., and different tunnels from the client to those gateways) for traffic of differing types, or having varying destinations, within the private network. Selection of an "appropriate" VPN gateway for particular traffic flows involving the client device involves the optimization of some performance criterion or combination of performance criteria, such as latency, throughput, internal network cost, and external network cost.

Depending upon embodiments of the invention, the client device can receive such information regarding another more preferable VPN gateway and can react in real-time to setup a second connection to the second VPN gateway and then transfer the current connection onto the VPN connection to the other gateway, or alternatively, in other embodiments, this information can be used to immediately setup a second VPN connection and the first or original VPN session to the less preferred gateway can be dropped and a new session and new connection to the destination can be activated. In yet another alternative, embodiments of the invention can allow the client to cache or otherwise "remember" the preferred VPN gateway for future sessions that will require access to the destination.

In one embodiment, the invention relates to a client device, such as a computerized device having at least one communications interface, a controller, and an interconnection mechanism coupling the at least one communications interface and the controller, that establishes a tunnel with a destination device. The client device establishes a first tunnel connection with a first gateway and transmits a data connection request to the first gateway where the data connection request requests establishment of a first data connection with the destination device. The client device receives a connection signal from the first gateway in response to detection, by the first gateway, of a connection characteristic associated with the data connection request where the connection signal indicates a second gateway for establishment of a second tunnel connection. The client device then establishes a second tunnel connection with the second gateway in response to receiving the connection signal and transmits a data connection request to the second gateway where the data connection request requests establishment of a second data connection with the destination device. By establishing the second tunnel connection with the second gateway, the client device predominantly utilizes the bandwidth of the public network to exchange data with the destination device, thereby decreasing data transmission burden and associated costs to the private network and potentially decreasing private network latency or congestion for the tunnel traffic. Also by establishing the second tunnel connection with the second gateway, the client device optimizes the overall total network path for communications between the client device and the destination, via the gateway.

In another embodiment, the client device, when receiving the connection signal, receives a connection command from the first gateway in response to detection, by the first gateway, of a connection characteristic associated with the data connection request. The connection command directs the client device to establish a second tunnel connection with the second gateway. The connection command allows for automatic establishment of the second tunnel connection by the client device without user intervention. The connection command also allows the client device to receive knowledge of its connection or proximity to other gateways, for example, not known to the first gateway.

In another embodiment, the client device, when receiving the connection signal, receives from the first gateway a connection profile having an address for a second gateway. The client device detects the address for the second gateway, for establishment of the second tunnel connection with the second gateway, based upon the connection profile received from the first gateway. The connection profile allows the client device to detect an appropriate second gateway for establishment of the second tunnel connection, as opposed to requiring the first gateway to determine the appropriate gateway. Use of the connection profile, therefore, frees resources associated with the first gateway.

In another embodiment, the client device establishes a first tunnel connection with a first gateway in a first session and receives a connection signal from the first gateway in response to detection, by the first gateway, of a connection characteristic associated with the data connection request. The connection signal indicates a second gateway for establishment of a second tunnel connection. The client device stores the connection signal within a storage location, such as a memory associated with the client device. The client device then deconstructs the first tunnel connection of the first session, retrieves the connection signal from the storage location, and establishes, in a second session, a second tunnel connection with the second gateway based upon the connection signal. By maintaining a data connection over the first tunnel connection during a first session and utilizing the second tunnel connection for a data connection during a second session, the client device limits potential disruption of the data connection caused by immediate transfer of data connection from the first tunnel connection to the second tunnel connection.

In one arrangement, the client device maintains the first tunnel connection with the first gateway after establishing the second tunnel connection in order to maintain state information relating to a data connection between the client device and the destination device made through the first tunnel connection. By maintaining state information with respect to a data connection, the client device limits the possibility of disrupting data transmissions with the destination device such as can be caused by transferring a data connection from the first tunnel connection to the second tunnel connection. In another arrangement, the client device deconstructs the first tunnel connection with the first gateway after establishing the second tunnel connection. By deconstructing the first tunnel connection, the client device removes unnecessary tunnels with the first gateway, thereby allowing the first gateway to establish additional tunnels with additional client devices without overloading the first gateway.

In yet another arrangement, the client device receives a connection signal from the first gateway where the connection signal indicates at least two secondary gateways for establishment of second tunnel connections. The client device establishes second tunnel connections with each of the at least two secondary gateways, based upon the connection signal. By establishing multiple tunnels with multiple gateways, the client device acts to load balance tunnels or tunnel connections and data connections among multiple gateways associated with a network.

In another embodiment, the invention relates to a first gateway for directing a data connection request between a client device and a destination device. The first gateway establishes a first tunnel connection with the client device and monitors a connection characteristic associated with a data connection request transmitted from the client device. The first gateway then transmits, to the client device, a connection signal in response to detection of the connection characteristic associated with the data connection request. The connection signal indicates, to the client device, a second gateway for establishment of a second tunnel connection. By causing the client device to establish the second tunnel connection with the second gateway, the first gateway causes the client device to utilize the bandwidth of the public network to exchange data with the destination device, thereby decreasing data transmission costs to the private network and decreasing private network latency.

In another embodiment, the invention relates to a computerized device having at least one communications interface, a controller, and an interconnection mechanism coupling the at least one communications interface and the controller. The computerized device is configured to establish a first tunnel connection with the client device, monitor a connection characteristic associated with a data connection request transferred from the client device, and transmit, to the client device, a connection signal in response to detection of the connection characteristic associated with the data connection request. The connection signal indicates, to the client device, a second gateway for establishment of a second tunnel connection.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a tunnel application that when performed on the processor, produces a tunnel process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a tunnel manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general-purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide methods and apparatuses for load balancing tunnels to a private network to provide relatively high data transmission performance while reducing traffic cost within the private network. A client device establishes a first tunnel connection, through a public network, with a first gateway of a private network and establishes, through the tunnel, a data connection with a destination device within the private network. The first gateway monitors or analyzes the geographic locations of the gateways associated with the private network relative to the geographic location of the destination device associated with the data connection. Based upon such monitoring, the first gateway transmits information to the client device relating to establishment of a second tunnel connection with a second gateway of the private network. The client device establishes the second tunnel connection with the second gateway and establishes a data connection with the destination device through the second gateway. By establishing the second tunnel connection with the second gateway, the client device utilizes the bandwidth of the public network to exchange data with the destination device, thereby decreasing data transmission costs to the private network and decreasing private network latency.

Figure 1:
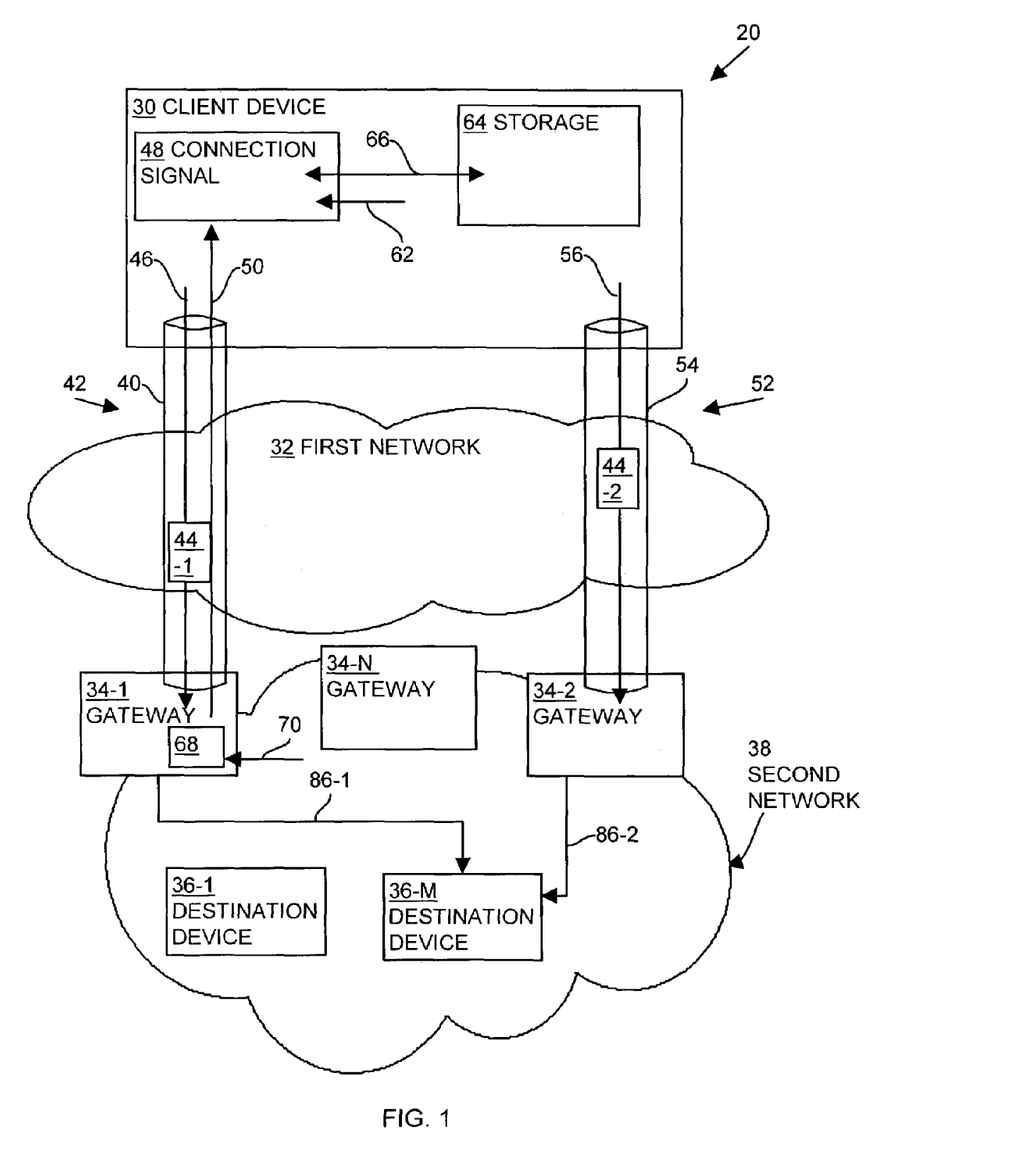
FIG. 1 is a block diagram of a data communication system, configured according to one embodiment of the invention.

FIG. 1 illustrates a data communications system 20, according to one embodiment of the invention. The data communications system 20 includes a client device 30, a first network 32, and a second network 38 having gateway devices 34 and destination devices 36.

The client device 30 is a computerized device, such as a personal computer, laptop computer, or VPN gateway configured to access or establish a connection with the second network 38. The client device 30, in one arrangement, is remote from the second network 38 where the term "remote" does not refer to physical distance, but rather to a location that is not part of the configured, second network 38. The client device 30 establishes a communications connection 40 with the second network 38 through the first network 32. In one arrangement, the first network 32 is a public network, such as the Internet while the second network 38 is a private network, such as a corporate network (e.g., local area network (LAN)).

As illustrated in FIG. 1, the second network 38 includes gateways 34-1, 34-2, 34-N, such as concentrators, and destination devices 36-1, 26-M, such as corporate resources, (e.g., computer servers and printers), accessible by users 30 who log into the second network 38. The gateways 34 provide the client device 30 with access to the destination devices 36 (e.g., corporate resources) within the second network 38 and allow for creation of a tunnel between the client device 30 and the second network 38. Each gateway 34 of the second network 38, in one arrangement, is located in a separate geographic location relative to the other gateways within the second network 38.

The connection between the second network 38 and the client device 30 (e.g., through the first network 32) is a tunnel 40 or tunnel connection. For example, the tunnel 40 includes a VPN connection between the client device 30 and the second network 38 established using a VPN tunneling protocol such as the IP Security Protocol (IPSec), the Layer 2 Tunneling Protocol (L2TP), the Point-To-Point Tunneling Protocol (PPTP), or Generic Routing Encapsulation (GRE). In one arrangement, such as in PPTP, the tunnel 40 is secured. In such an arrangement, point-to-point protocol (PPP) encryption protects or limits the interception of data transmitted within the first network 38 by an unauthorized user. In another arrangement, such as in L2TP, the tunnel is unsecured.

The tunnel 40 has, in one arrangement, an associated Internet protocol (IP) address pair. For example, the IP address pair includes a source address and a destination address associated with the tunnel 40. The client devices 30 and gateways 34 utilize the tunnel IP address pair to ensure that data transmissions made through the public network 32 are transmitted through the tunnel connection 40.

Figure 2:
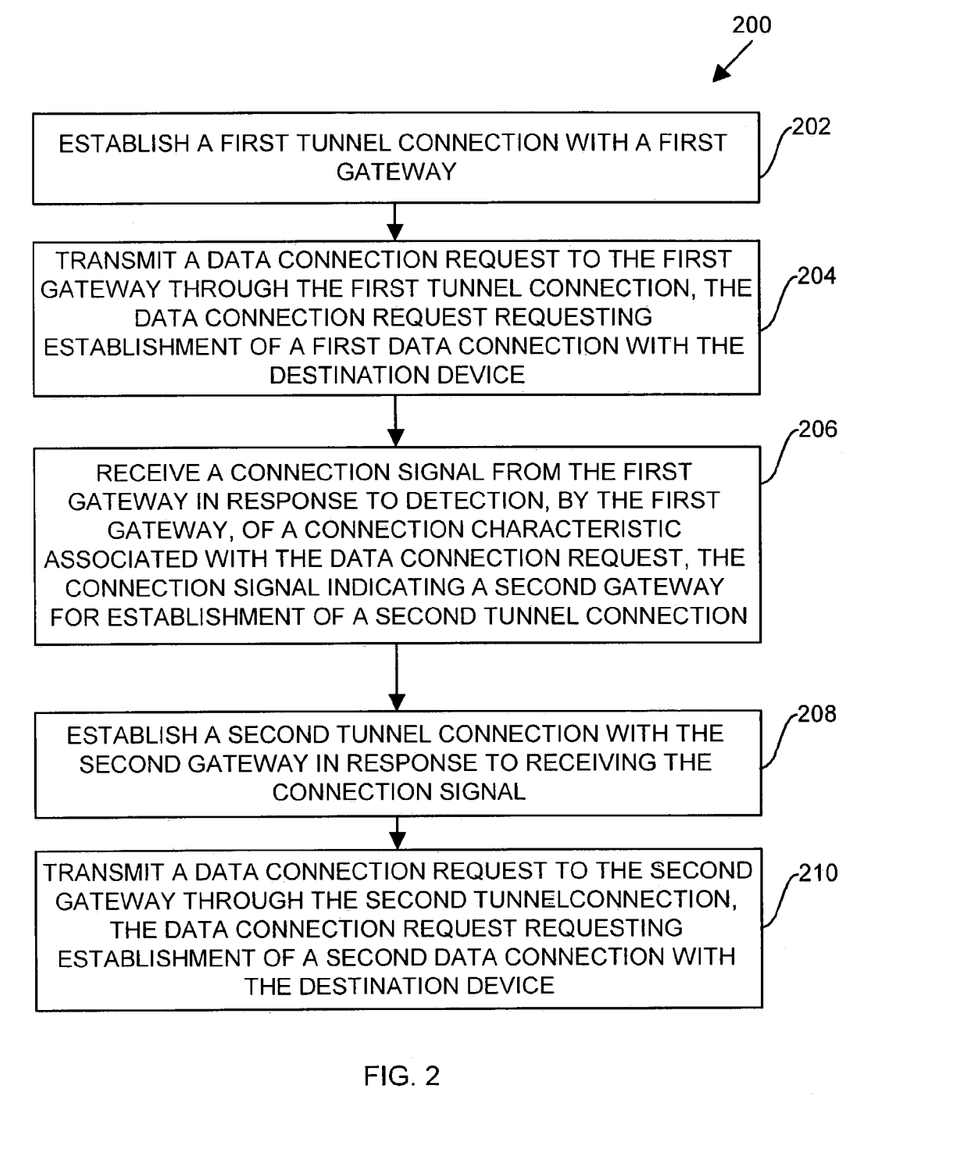
FIG. 2 is a flowchart of a procedure performed by the client device of FIG. 1, configured according to one embodiment of the invention.

FIG. 2 illustrates a flowchart showing a method 200 performed by the client device 30 of the data communications system 20, according to one embodiment of the invention. In the method 200, the client device 30 establishes a tunnel connection 40 with a destination device 36 of the second network 38.

In step 202, the client device 30 establishes 42 a first tunnel connection 40 with a first gateway 34-1. For example, the client device 30 establishes, with the first gateway 34-1, a tunnel connection 40, such as a VPN connection, through the first network 32. Such a tunnel connection 40 allows for transmission of private (e.g., corporate) network data, between the client device 30 and the second network 38, through a public network.

When establishing the first tunnel connection 40 with the first gateway 34-1, for example, assume the client device 30 and the first gateway 34-1 are located in Paris, France and the second gateway 34-2 is located in San Jose, Calif. When selecting a gateway 34 for establishment of a tunnel connection to the second network 38, the client device 30 typically selects a gateway 34 based upon the geographic proximity of the client device 30 relative to the available gateways 34. In the present example, the client device 30 selects the first gateway 34-1 located in Paris, France to access the second (e.g., private) network 38 based upon the relatively close proximity of the client device 30 to the first gateway 34-1 compared to the relative distant proximity of the client device to the second gateway 34-2 (e.g., Paris to San Jose connection). After selecting the first gateway 34-1 the client device 30 establishes 42 the first tunnel connection 40 with the first gateway 34-1 through the first (e.g., public) network 32.

In step 204, the client device 30 transmits 46 a data connection request 44-1 to the first gateway 34-1 through the first tunnel connection 40 where the data connection request 44-1 requests establishment of a first data connection 86-1 with a destination device 36-M. In one arrangement, the data connection request 44-1 is a request for content located on a destination device 36-M, such as a server, within the second network 38. For example, the data connection request 44-1 is a TCP Syn packet transmitted through an already-established IPSec tunnel, In step 206, the client device 30 receives a connection signal 48 from the first gateway 34-1 in response to detection 70, by the first gateway 34-1, of a connection characteristic 68 associated with the data connection request 44-1. The connection signal 48 indicates a second gateway 34-2 for establishment of a second tunnel connection 54.

As will be described later, the first gateway 34-1 detects a connection characteristic 68 associated with data connection request 44. In one embodiment, the connection characteristic 68 relates to the relative locations of the client device 30, the first gateway 34-1, the destination device 36-M and other gateways 34 associated with the second network 38 (e.g., topology of the system 20). For example, assume that the client device 30 and the first gateway 34-1 are located in Paris, France and the second gateway 34-2 is located in San Jose, Calif. Also assume that the client device 30 transmits 46 a data connection request 44-1 to the first gateway 34-1 for establishment of a first data connection 86-1 with a destination device 36-M located in San Jose (e.g., as indicated by a destination IP address within the data connection request 44-1). The first gateway 34-1 detects that, with respect to the relative locations of the client device 30 (Paris), the first gateway 34-1 (Paris), the second gateway 34-2 (San Jose), and the destination device 36 (San Jose), the optimal secure connection (e.g., the secure connection that reduces traffic or use of bandwidth within the second network 38) between the client device 30 and the destination device 36 can be made through the second gateway 34-2 (e.g., San Jose gateway used for data connection 86-2 to San Jose destination device 36-M).

As mentioned, the connection signal 48 indicates a second gateway 34-2 for establishment of a second tunnel connection 54. For example, the connection signal 48, as provided by the gateway 34-1, is either a dynamic connection signal or a static connection signal.

In the case where the connection signal 48 is a dynamic connection signal, the connection signal 48 is a connection command 48 that directs the client device 30 to establish the second tunnel connection 54 with the second gateway 34-2. For example, the connection command 48 is an instruction executed by the client device 30 that causes the client device 30 to establish a data connection with the destination device 36-M through a second tunnel connection 54 with the second gateway 34-2. In such a case, the connection signal 48 is "dynamic" in that the first gateway 34-1 actively causes the client device 30 to establish 54 the second secure connection 54 with a particular, second gateway 34-2.

In the case where the connection signal 48 is a static connection signal, the connection signal 48 is a connection profile 48 having an address for a second gateway 34-2. For example, and as will be described later, while monitoring the connection characteristic 68 of the data connection request 44-1, the gateway 34-1 develops a connection profile 48 relating to each gateway 34 within the second network 38 and relating to the relative connection speeds or data transfer speeds for transfer of data between each gateway 36 and the destination device 36. Based on the connection profile 48, (e.g., data transfer speeds) the client device 30 detects an address for a second gateway 34-2 for establishment 52 of a second tunnel connection 54. In such a case, the connection signal is "static" because the first gateway 34-1 passively allows the client device 30 to select a second gateway 34-2, based upon the profile 48, to establish 52 a second tunnel connection 54 with the second gateway 34-2.

In step 208, the client device 30 establishes 52 a second tunnel connection 54 with the second gateway 34-2 in response to receiving 50 the connection signal 48. The second tunnel connection 54, allows for transmission of private (e.g., corporate) network data, between the client device 30 and the second network 38, through a public network.

The connection signal 48, (e.g., either a dynamic connection signal or a passive connection signal) in one embodiment, affects the way in which the client device 30 establishes 52 the second tunnel connection 54. In one embodiment, the client device 30 automatically establishes the second tunnel connection 54 in response to receiving the connection command 48 (e.g., dynamic connection signal) from the first gateway 34-1. In another embodiment, the client device 30 establishes the second tunnel connection 54 after detecting an address for the second gateway 34-2 based upon the connection profile 48 (e.g., static connection signal) received from the first gateway 34-1.

In step 210, the client device 30 transmits 56 a data connection request 44-2 to the second gateway 34-2 through the second tunnel connection 54, the data connection request 44-2 requesting establishment of a second data connection 86-2 with the destination device 36-M.

For example, assume the client device 30 and the first gateway 34-1 are located in Paris, France and the second gateway 34-2 and the destination device 36-M are located in San Jose, Calif. The client device 30 requests 44-2 establishment of a data connection 86-2 with the destination device 36-M through the second gateway 34-2 based upon the relative locations of the second gateway 34-2 and the destination device 36-M (each located in San Jose). The client device 30, therefore, utilizes the bandwidth of the first or public network 32 to exchange data with the destination device 36-M, thereby decreasing data transmission costs to the second, private network 38 and decreasing latency of the network 38.

As described above, the client device 30 establishes 52 a second tunnel connection 54 with a second gateway 34-2 in response to receiving 50 a connection signal 48 from a first gateway 34-1. In one arrangement, after the client device 30 has established the second tunnel connection 54 with the second gateway 34-2, the client device 30 is configured to execute a maintenance procedure for the established, first tunnel connection 40.

Figure 3:
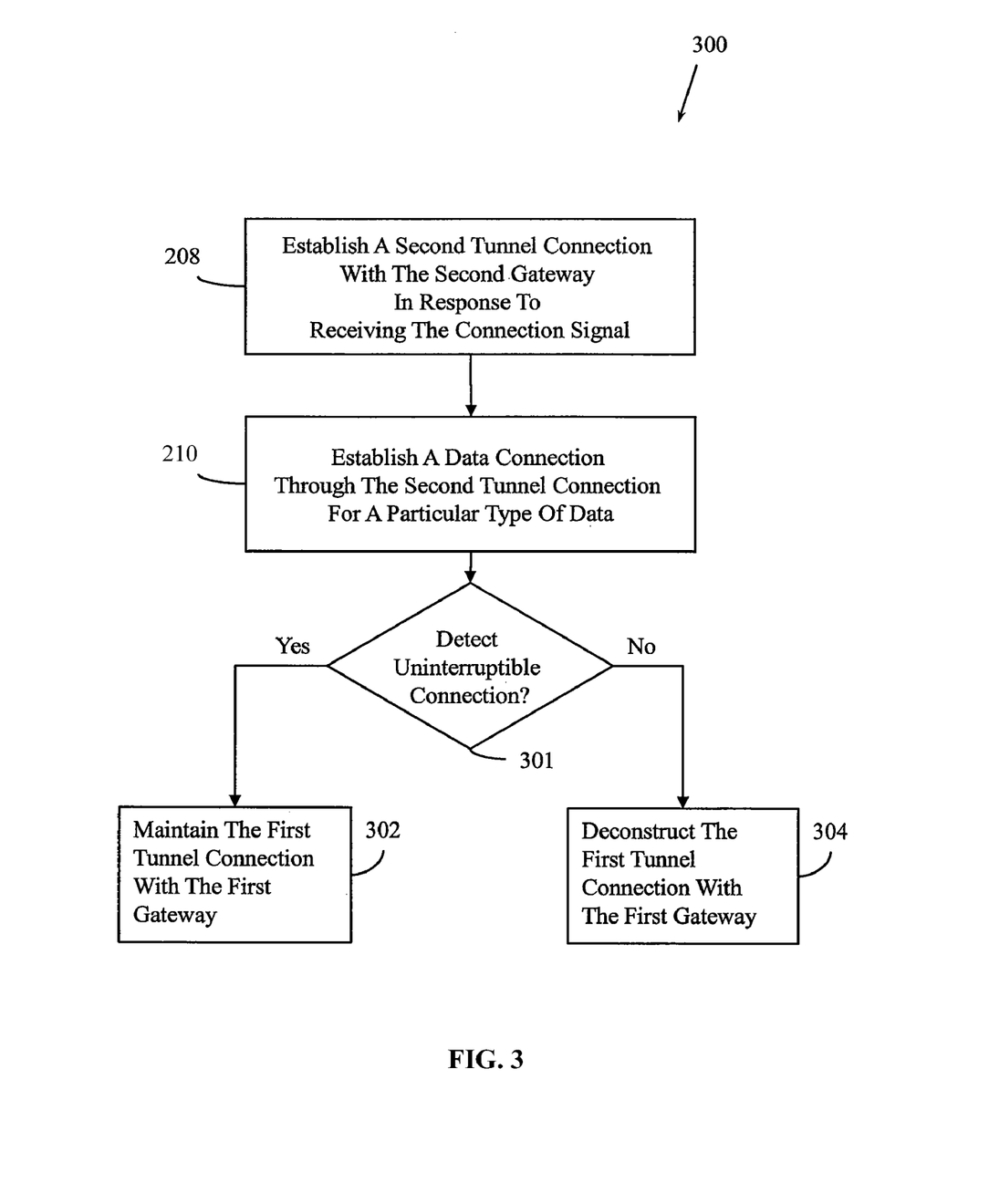
FIG. 3 is a flowchart of a procedure performed by the client device of FIG. 1, configured according to another embodiment of the invention.

FIG. 3 illustrates a flowchart showing methods 300 performed by the computerized device 30 for executing a maintenance procedure relating to the established first tunnel connection 40 with the first gateway 34-1.

In step 208, the client device 30 establishes 52 a second tunnel connection 54 with the second gateway 34-2 in response to receiving 50 a connection signal 48 from the first gateway 34-1. Step 208 is described in detail above with respect to FIG. 2.

In step 302, the client device 30 executes a maintenance procedure for the established, first tunnel connection 40 by maintaining the first tunnel connection 40 with the first gateway 34-1 after establishing the second tunnel connection 54 with the second gateway 34-2.

In one embodiment, the client device 30 maintains the first tunnel connection 40 with the first gateway 34-1 in order to maintain state information relating to a data connection 86-1 between the client device 30 and the destination device 36 made through the first tunnel connection 40. For example, application level sessions, such as transmission control protocol (TCP) sessions between the client device 30 and the destination device 36, depend upon source and destination IP addresses (e.g., an IP address pair) related to the client 30 and destination 36 devices. Also, as described above, each tunnel connection 40 has an associated IP address pair. The client 30 and destination 36 devices utilize the tunnel IP address pair to ensure that the data transmissions (e.g., TCP data transmissions between the client 30 and destination 36), made through the public network 32, are transmitted through the first tunnel connection 40. If the client device 80 were to deconstruct the first tunnel connection 40 after establishing a second tunnel connection 54, the client device 30 can potentially disrupt the application level session occurring over the first tunnel connection 40 and produce an error with respect to the data transmission 86 between the client 30 and destination 36 devices.

In another embodiment, the client device 30 maintains the first tunnel connection 40 with the first gateway 34-1 when the first tunnel connection 40 carries multiple data connections between the client device 30 and the second network 38 and the client device 30 detects the presence of an application level session through the first tunnel connection 40 that should remain intact. In one example, the client device 30 establishes a first tunnel connection 40 with the first gateway 34-1. Through the tunnel 40, the client device 30 also establishes multiple data connections 86 with the destination device 36-M, such as a first data connection 86-1 and a second data connection 86-2. In this example, the first data connection 86-1 is an e-mail data connection and the second data connection 86-2 is a voice over IP (VOIP) data connection (e.g., Internet telephony connection).

Based upon the data connection 86 or data connection request 44-1, the first gateway 34-1 detects 70 a connection characteristic 68 associated with the data connections 86-1, 86-2 to initiate establishment of a secondary tunnel connection 54 between the client device 30 and the network 38. Such a second tunnel connection 54 provides for the creation of a data connection between the client device 30 and the destination device 36-M to allow for an optimal (e.g., efficient) utilization use of resources within the second network 38. For example, assume the first gateway 34-1 examines a data transmission protocol 68 of the data connections 86 and detects that, to efficiently utilize of resources within the second network 38 (e.g., such as based on data transmission speed), VOIP traffic connections are to be established through a second gateway 34-2, rather than through the first gateway 34-1.

The first gateway 34-1 transmits the connection signal 48 to the client device 30 indicating that, for VOIP traffic, the client device 30 establishes a second tunnel connection 54 with the second gateway 34-2. Based upon the connection signal 48, the client device 30 establishes the second tunnel connection 54 with the second gateway 34-2 and utilizes the second tunnel connection 54 for transmission of existing VOIP data connections 86-2 with the destination device 36-M. For example, the client device 30 transfers a VOIP connection between the client device 30 and the destination device 36 for an existing VOIP connection while maintaining the VOIP connection with the destination device 36. Also based upon the connection signal 48, the client device 30 detects the existing email data connection 86-1 at 301 as an application level session connection that cannot be interrupted, such as caused by transferring the email data connection 86-1 to the second tunnel connection 54 and deconstructing the first tunnel connection 40. The client device 30, therefore, maintains the first tunnel connection 40 in order to maintain the email data connection with the destination device 36.

In one arrangement, after the client device 30 establishes the second tunnel connection 54 with the second gateway 34-2, the client device monitors a data characteristic of data to be transmitted through a tunnel connection to ensure that the client device 30 transmits the data through the appropriate tunnel. For example, as in the above example, the client device 30 transmits email data to a first gateway 34-1 through a first tunnel connection 40 and transmits VOIP data to a second gateway 34-2 through a second tunnel connection 54. Prior to transmitting either the email data or VOIP data, the client device 30 examines (e.g., actively examines) a data characteristic of the data (e.g., indicating the type of data being transmitted or the destination of the data). The client device 30 then allocates a particular tunnel connection for transmission of the data based upon the data characteristic (e.g., the client device dynamically assigns the data to an appropriate tunnel connection). For example, in the case of VOIP data, the client device 30 examines the data characteristic of the VOIP data (e.g., indicating that the data is VOIP data) and assigns the VOIP data to the second tunnel connection 54 for transmission to the second gateway 34-2.

In one arrangement, after the client device 30 establishes the second tunnel connection 54 with the second gateway 34-2, the client device 30 utilizes the second tunnel connection 54 for transmission of data for subsequent data connections, as opposed to existing data connections, made during an existing tunnel session. For example, assume the client device 30 establishes 52 a second tunnel connection 54 with the second gateway 34-2 for transmission of VOIP data and assume that the client device 30 has an existing VOIP data connection with the destination device 36-M through the first gateway 34-1. In this example, the client device 30 maintains the VOIP data connection 86-1, using the first tunnel connection 40, for the life of the connection (e.g., until the end of the VOIP data transmission session). At the onset of a subsequent VOIP data transmission with the destination device 36-M, the client device 30 sends and receives VOIP data (e.g., establishes a VOIP data connection) using the second tunnel connection 54. Such a configuration allows the client device 30 to utilize the second tunnel connection 54 while minimizing the possibility of disrupting an existing VOIP data transmission. The configuration also allows the client device 30 to maintaining the first tunnel connection 40 with the first gateway 34-1 to minimize disruption of other existing application level data transmissions, such as TCP communication sessions.

In step 304, the client device 30 executes a maintenance procedure for the established, first tunnel connection 40 by deconstructing the first tunnel connection 40 with the first gateway 34-1 after establishing 52 the second tunnel connection 54 with the second gateway 34-2. By deconstructing the first tunnel connection 40, the client device 30 removes unnecessary tunnel connections 40 with the first gateway 34-1, thereby allowing the first gateway 34-1 to establish additional tunnel connections 40 with additional client devices 30 without overload to the first gateway 34-1.

In one arrangement, the client device 30 deconstructs the first tunnel connection 40 with the first gateway 34-1 when the client device 30 detects that an existing data connection 86, made through the first tunnel connection 40, can be routed through the second tunnel connection 54 without disrupting the data connection 86. For example, in one embodiment, after the client device 30 reroutes the data connection 86, such as from the first tunnel connection 40 to the second tunnel connection 54, the client device 30 detects that the first tunnel connection 40 does not transmit data or packets associated with the data connection 86 through the first tunnel connection 40. Such detection ensures that the destination device 36 does not use the first tunnel connection 40 for data transferal or maintenance of state information relating to the data connection 86.

Figure 4:
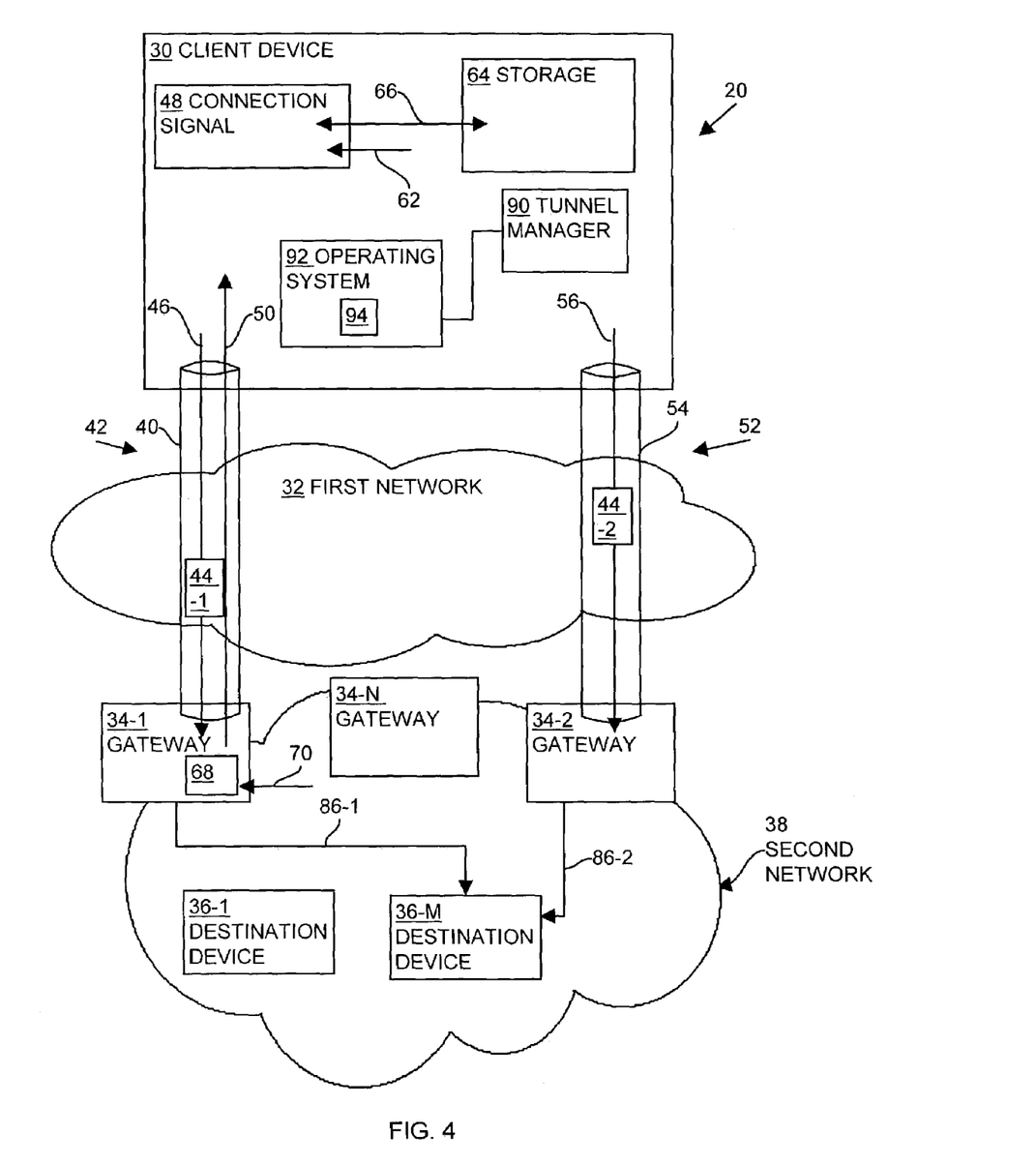
FIG. 4 is a block diagram of a data communication system, configured according to another embodiment of the invention.

FIG. 4 illustrates another arrangement of the data communications system 20. In this arrangement, the client device 30 has a tunnel manager 90 (e.g., a tunnel manager process) configured to provide transition (e.g., seamless or uninterrupted transition) of active applications or data connections 86 from the first tunnel 40 to the second tunnel 54.

In one embodiment, each gateway 34-1, 34-2 assigns a distinct IP address to its established tunnel, the first tunnel connection 40 and second tunnel connection 54, respectively. The tunnel manager 90 enters the IP addresses into an IP routing table 94, associated with an operating system 92, as two virtual interfaces (e.g., similar to a computer having with two attached Ethernet ports attached, each port having a distinct assigned IP address). The tunnel manager 90 then uses standard techniques (e.g., existing networking capabilities within the operating system 92) for IP routing between the first tunnel 40 and second tunnel 54. For example, different weights (e.g., hop count) can be associated with each IP address entry in the IP routing table 94 to help direct traffic from one tunnel to another tunnel (e.g., from the first tunnel connection 40 to the second tunnel connection 54).

In another embodiment, the tunnel manager 90 uses technology often used in a Network Address Translation (NAT) device, or load balancing system, together with content analysis of traffic entering each tunnel to transition data connections 86 from the first tunnel 40 to the second tunnel 54 without disruption. For example, the tunnel manager 90 hides the existence of multiple tunnels (e.g., the first tunnel 40 and the second tunnel 54) from the operating system 92 and applications executed on the operating system 92 by using techniques such as IP address rewrites, timeout of sessions, and Application Specific Gateway functions (e.g., similar to a NAT hiding, to systems beyond the NAT, multiple IP addresses connected to multiple computers). The tunnel manager 90, therefore, shields the operating system 92 from "knowing" that there is more than one tunnel (e.g., encrypted tunnel or secured connection) allowing for transmission and reception of traffic or data. Such shielding allows for transition data connections 86 from the first tunnel 40 to the second tunnel 54 without disruption to the operating system 92.

In another arrangement, the client device 30 deconstructs the first tunnel connection 40 with the first gateway 34-1 when the client device 30 detects the relatively low priority for data transmission for a particular data connection. In one case, assume that the client device 30 establishes a first tunnel connection 40 with the first gateway 34-1 where the first tunnel connection 40 carries multiple data connections 86-1, 86-2 to a destination device 36-M, where each data connection includes a different data protocols. For example, assume the first tunnel connection 40 carries an email data connection as a first data connection 86-1 and a VOIP data connection as a second data connection 86-2. Also assume that the client device 30 reroutes the VOIP data connection through the second tunnel connection 54 based upon a connection signal 48 received from the first gateway 34-1. With a single data connection 86-1, the client device 30 detects the relative priority level of the data connection 86-1 within the tunnel connection 40. In the case of an email data connection, the client device 30 detects that the email data connection constitutes a relatively low delivery priority. Based upon the detection of low data transmission priority for the data connection 86-1, therefore, the client device 30 deconstructs the first tunnel connection 40 with the first gateway 34-1.

In yet another arrangement, the client device 30 deconstructs the first tunnel connection 40 at the end of a first session and establishes the second tunnel connection 54 at the start of a second session.

The client device 30 establishes a first tunnel connection 40 with a first gateway 34-1 in a first session, such as a first VPN connection session. After the client device 30 receives the connection signal 48 from the first gateway 34-1, the client device 30 stores the connection signal 48 within a storage location 64, such as a memory location, associated with the client device 30. As described above, the connection signal 48 indicates a second gateway 34-2 for establishment of a second tunnel connection 54 through which the client device 30 exchanges data with the destination device 36-M. At the end of the first session, the client device 30 deconstructs the first tunnel connection 40 with the first gateway 34-1. When the client device 30 later establishes a data connection with the same destination device 36-M through the first network 32, the client device 30 retrieves the connection signal 48 from the storage location 64 and establishes, in a second session, a second tunnel connection 54 with the second gateway 34-2 based upon the connection signal 48.

For example, assume the client device 30 maintains the first tunnel connection 40 with the first gateway 34-1 for the duration of the first data traffic session. The client device 30, in this example, receives email data traffic associated with a destination device 36 through the first tunnel connection 40 established with the first gateway 34-1. Also assume the client device 30 receives a notification (e.g., the connection signal 48) to use a second gateway 34-2 to establish a second tunnel connection 54 to receive email data traffic from the destination device 36. In the present embodiment, the client device 30 stores the connection signal 48 within the storage location 64 and maintains the first tunnel connection 40 with the first gateway 34-1 until the end of the email data traffic session. Upon initiating a subsequent tunnel connection 54 to the destination device 36 for a second email data traffic sessions, the client device 30 retrieves the notification 48 from the storage location 64 and utilizes the address information in the notification 48 to establish a second tunnel connection 54 with the second gateway 34-2.

As described above, the client device 30 establishes a single second tunnel connection 54 with a single second gateway 34-2. Alternately, the client device 30 establishes multiple second tunnel connections 54-1, 54-2 with multiple secondary gateways 34-N, 34-2.

Figure 5:
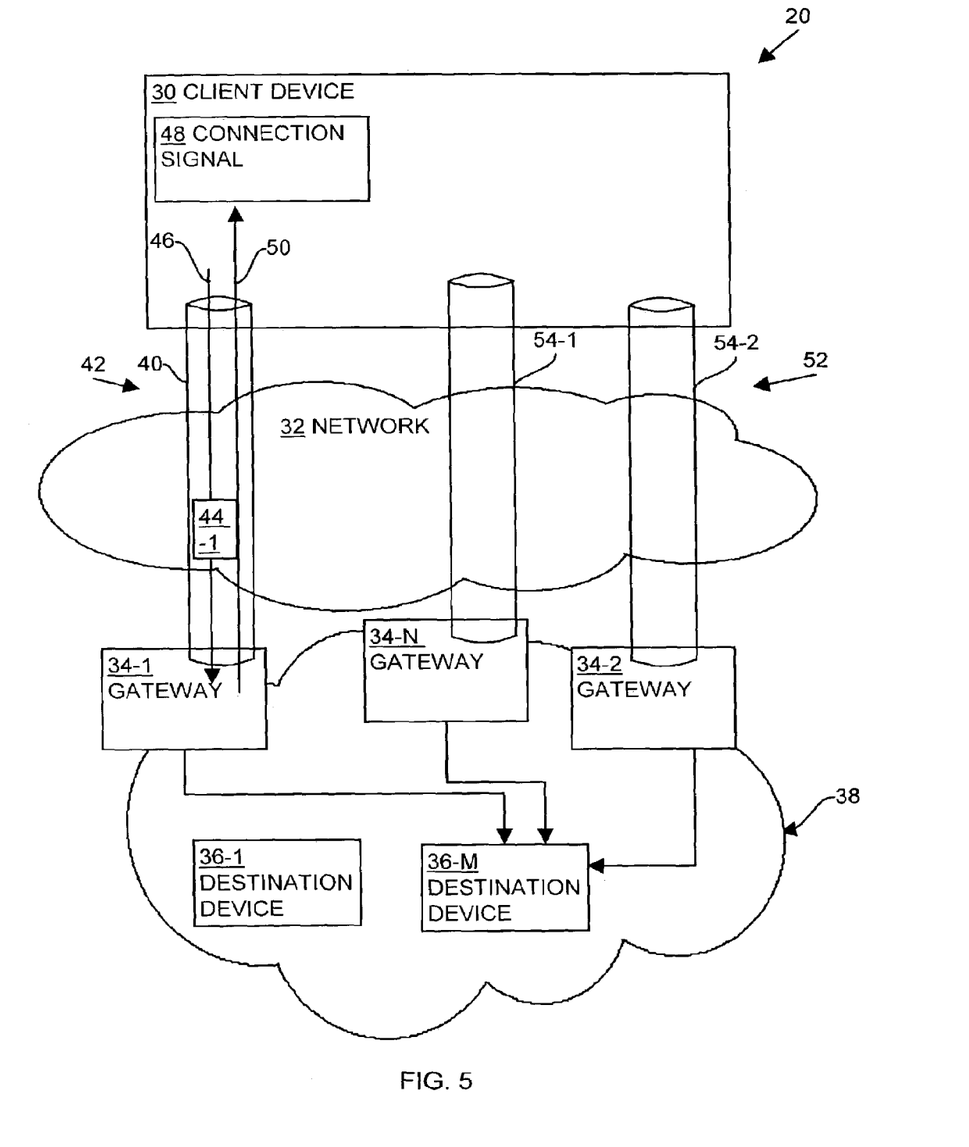
FIG. 5 is a block diagram of a data communication system, configured according to another embodiment of the invention.

FIG. 5 illustrates another embodiment of the data communications system 20. In this embodiment, the client device 30 receives 50 a connection signal 48 from the first gateway 34-1 where the connection signal 48 indicates two secondary gateways 34-N, 34-2 for establishment of second tunnel connections 54-1, 54-2. Based upon the connection signal 48, the client device 30 establishes second tunnel connections 54-1, 54-2 with each of the two secondary gateways 34-N, 34-2.

For example, assume that the first gateway 34-1 detects that the second gateway 34-2 receives multiple requests for establishment of tunnel connections 54 from multiple client devices 30 (e.g., the second gateway becomes overloaded). With the second gateway 34-2 serving multiple client devices 30, the relative efficiency or speed at which each client device 30 receives information over their respective data connections made through the respective tunnel connections 54 with the second gateway 34 decreases. By utilizing multiple tunnel connections 54-1, 54-2, with multiple second gateways 34-N, 34-2 the client device 30 acts to balance the load on particular gateways associated with the second network 38. Such load balancing helps improve the performance of the second network 38 by lowering the latency associated with the second network 38.

As described above, each gateway 34 associated with the network 38 provides client devices 30 with access to the destination devices 36 (e.g., corporate resources) within the second private network 38. Each gateway 34 allows for the establishment of a tunnel 40 with a client device 30 through a first, public network 32.

Figure 6:
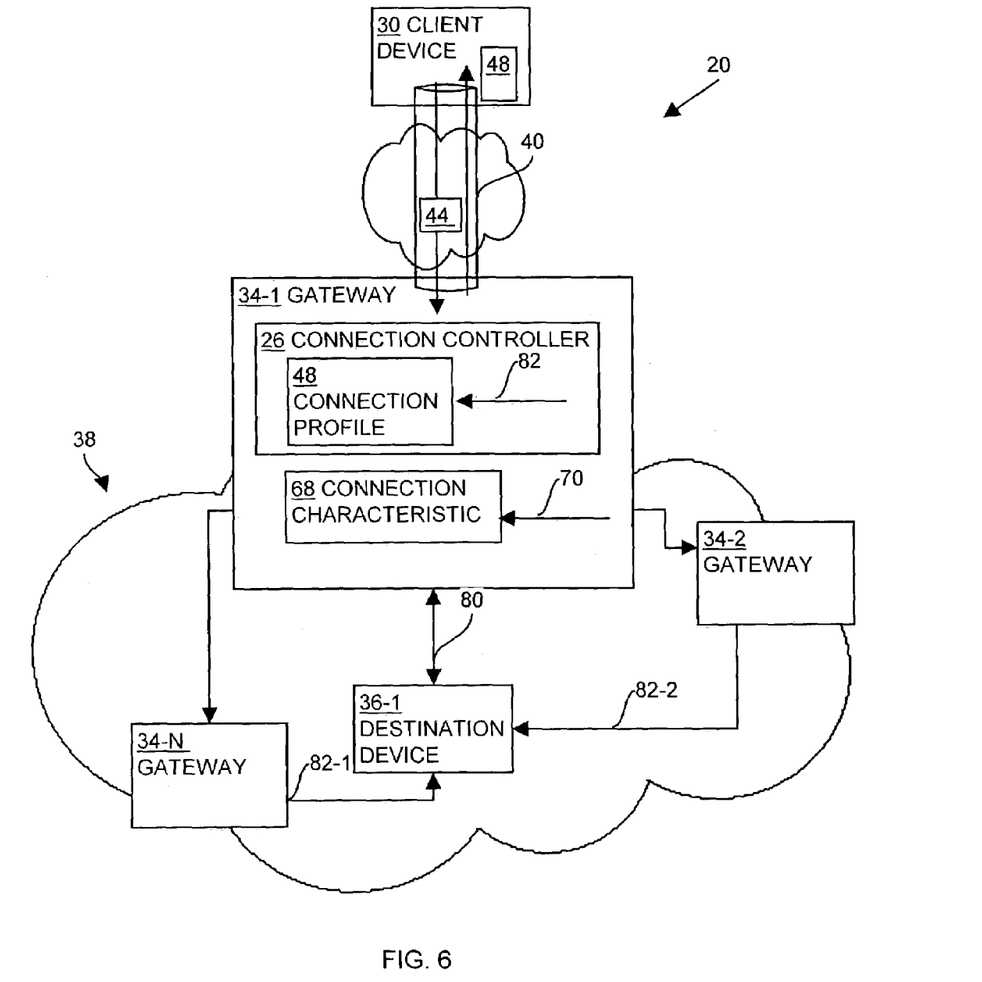
FIG. 6 is a block diagram of a data communication system, configured according to another embodiment of the invention.

FIG. 6 illustrates an embodiment of a first gateway 34-1 within the data communications system 20. During operation, the first gateway 34-1 establishes 42 a first tunnel connection 40 with the client device 30 and monitors 70 a connection characteristic 68 associated with a data connection request 44 transmitted from the client device 30. Based upon the connection characteristic 68, the first gateway 34-1 detects a second gateway 36-2, 36-N within the second network 38 that provides a relatively more efficient transmission of data, through a tunnel connection 54, between the client device 30 and a particular destination device 36, as compared to other gateway devices 34 associated with the second network 38.

In one arrangement, the connection characteristic 68 is a protocol characteristic related to the data connection request 44. For example, when the first gateway 34-1 detects a protocol characteristic 68 associated with the connection request 44, the first gateway 34-1 reviews the protocol type (e.g., email, VOIP) associated with the data 30 connection request 44. In another arrangement, the connection characteristic 68 is a location characteristic related to the destination of the data connection request 44. For example, when the first gateway 34 1 detects a location characteristic 68 associated with the connection request 44, the first gateway 34-1 reviews the destination IP address associated with the data connection request 44.

After detecting the connection characteristic 68 associated with the data connection request, the first gateway 34-1 transmits 50 a connection signal 48, based upon the connection characteristic 68, to the client device 30 indicating a second gateway 34-2 for establishment of a second tunnel connection 54.

In one arrangement, connection signal 48 is a connection profile that indicates particular destination devices 36 within the network 38 and the relative speeds for obtaining data among each gateway 34 within the network 38 for the particular destination devices 36. The first gateway 34-1 transmits the connection profile 48 to the client device 30 to allow the client device 30 to detect an appropriate gateway 34, associated with second network 38, for establishment of a data connection with a destination device through a second tunnel connection 54. The first gateway 34-1 obtains the connection profile 48 in several different arrangements.

In one embodiment, the first gateway 34-1 is preconfigured with the connection profile 48 for the second network 38. Such a connection profile 48 is a static profile and can be used in cases where the destination devices 36 within the second network 38 and the data located on the destination devices 36 within the second network remain relatively unchanged.

In another embodiment, the first gateway 34-1 receives 82 the connection profile 48 from a device associated with the data communications system 20, such as a computerized device (e.g., server) within the system 20. The computerized device can provide updated connection profiles 48 to the first gateway 34-1 based upon policy changes within the network 38. For example, when destination devices 36 are removed or added to the network 38 or when data is transferred among destination devices 36 within the second network 38, the computerized device provides updated connection profiles 48 to the first gateway 34-1, indicating the changes to the second network 38.

In another embodiment, the first gateway 34-1 has a connection controller 26 that develops or builds a connection profile 48 based upon the detected 70 connection characteristic 68 associated with the data connection request 44.

For example, when building a connection profile 48, after detecting a location characteristic 68 associated with the data connection request 44, the first gateway 34-1 utilizes a trace route process to determine a path between the first gateway 34-1 and the destination device 36-M indicated by the destination IP address of the data connection request 44. By using the trace route process, for example, the first gateway 34-1 determines a path 80 in the second network 38 (e.g., a route containing multiple "hops" among devices within the second network 38) from the first gateway 34-1 to the destination device 36-1 and the total time of travel for data (e.g., a packet) along the path 80. The gateway 34-1 also uses a forced trace route process to cause other distinct gateways 34-2, 34-N within the second network 38 to determine the path 82-1, 82-2 from each gateway 34-N, 34-2 to the destination device 36-1 indicated by the destination IP address of the data connection request and the total time of travel for data along each path 82-1, 82-1. Based upon the results of the trace route and the forced trace route procedure, the first gateway 34-1 creates a connection profile 48 that includes a list of the gateways 34 within the network 38 and the respective route paths to a specific destination device 36, as indicated by location characteristic 68.

In another example, when building a profile 48 after detecting a protocol characteristic, the first gateway 34-1 detects the availability destination device 36 that is configured to only provide data for a particular protocol type, such as a VOIP server within the second network 38. When the first gateway 34-1 detects the availability, within the network 38, of a destination device 36 configured provide VOIP data, as associated with the data connection request 44, the first gateway 34-1 uses a forced trace route process to force other gateways 34-2, 34-N within the second network 38 to determine the path 82-1, 82-2 from each gateway 34-2, 34-N to the destination device 36-M. Based upon the results of the forced trace route procedure, the gateway 34-1 creates a connection profile 48 that includes a list of the gateways 34 within the second network 38 on the associated gateway route path 82-1, 82-2 to the VOIP server.

In another arrangement, connection signal 48 is a connection command 48 that directs the client device 30 to establish the second tunnel connection 54 with the second gateway 34-2. As described above, the connection command 48 is an instruction transmitted by the first gateway 34-1 and executed by the client device 30 that causes the client device 30 to direct a data connection request 44 to the second network 38 through a second tunnel connection 54 with the second gateway 34-2.

Figure 7:
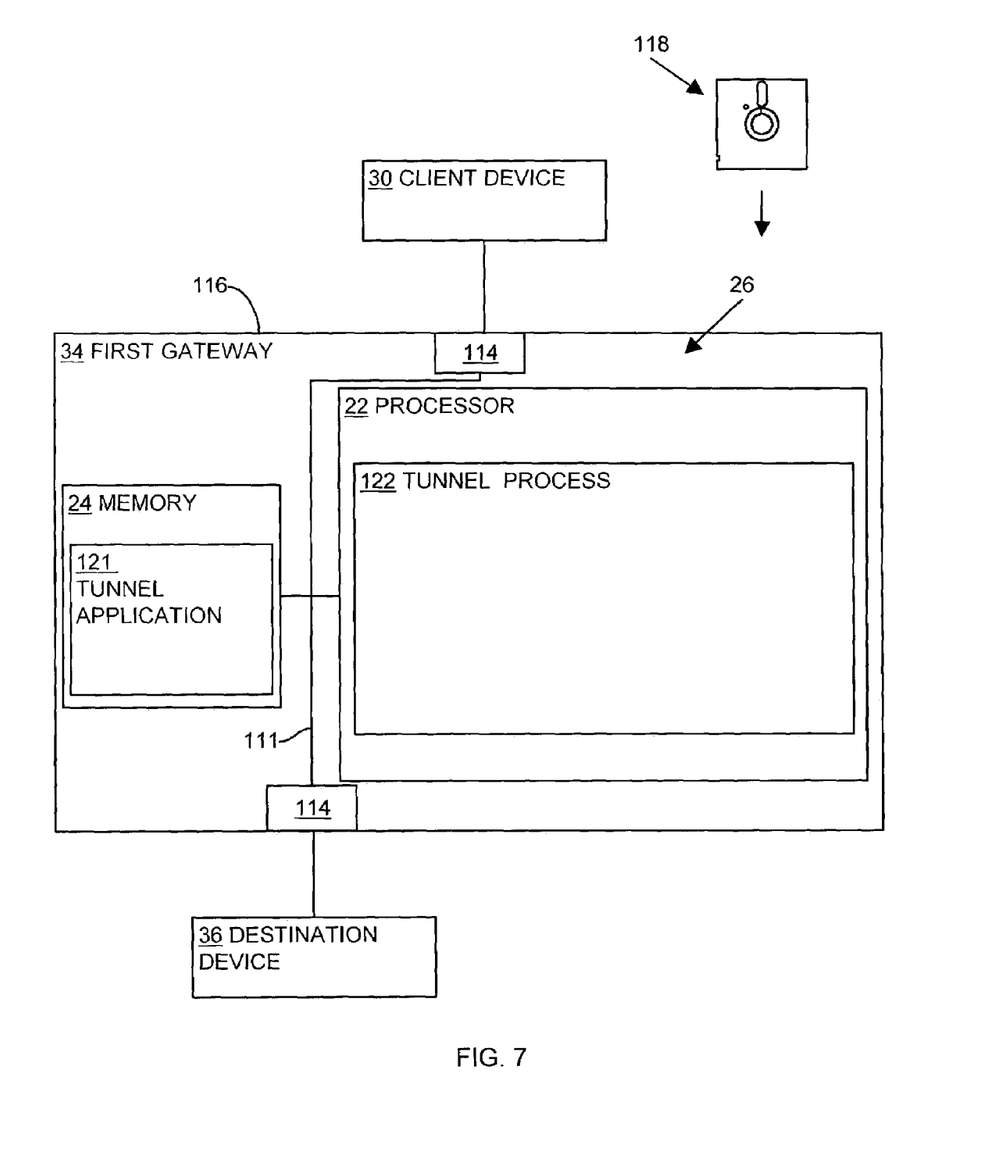
FIG. 7 is a block diagram of a computerized device, configured according to one embodiment of the invention.

FIG. 7 illustrates a more detailed architecture of a gateway device 34 configured as a computerized device 116, according to one embodiment of the invention. A computer program product 118 includes an application or logic instructions, such as tunnel instructions, that are loaded into the gateway device 34 to configure the gateway device 34 to direct a tunnel connection between a client device 30 and a second gateway.

The gateway device 34 in this embodiment of the invention includes an interconnection mechanism 111 such as a data bus and/or other circuitry that interconnects a controller 26, including a memory 24 and a processor 22, and one or more communications interfaces 114.

The memory 24 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 24 is encoded with logic instructions (e.g., software code) and/or data that form a tunnel application 121 configured according to embodiments of the invention. In other words, the tunnel application 121 represents software code, instructions and/or data that represent or convey the processing logic steps and operations as explained herein and that reside within memory or storage or within any computer readable medium accessible to the computerized device 34.

The processor 22 represents any type of circuitry or processing device such as a central processing unit, microprocessor or application-specific integrated circuit that can access the tunnel application 121 encoded within the memory 24 over the interconnection mechanism 111 in order to execute, run, interpret, operate or otherwise perform the tunnel application 121 logic instructions. Doing so forms the tunnel process 122. In other words, the tunnel process 122 represents one or more portions of the logic instructions of the tunnel application 120 while being executed or otherwise performed on, by, or in the processor 22 within the gateway device 34.

Figure 8:
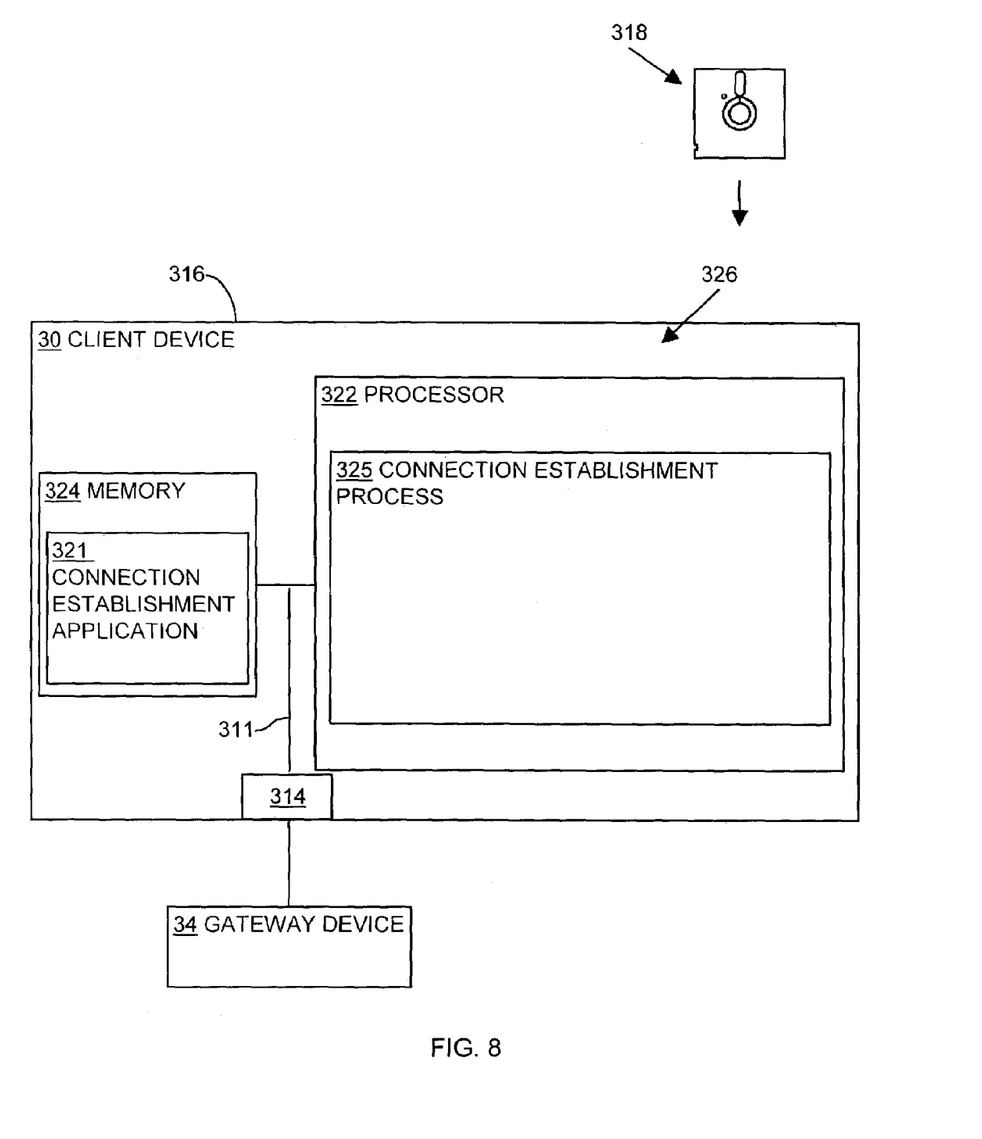
FIG. 8 is a block diagram of a computerized device, configured according to another embodiment of the invention.

FIG. 8 illustrates a more detailed architecture of a client device 30 configured as a computerized device 116, according to one embodiment of the invention. A computer program product 318 includes an application or logic instructions, such as connection establishment instructions, that are loaded into the client device 30 to configure the client device 30 to establish a tunnel with a gateway 34.

The client device 30 in this embodiment of the invention includes an interconnection mechanism 311 such as a data bus and/or other circuitry that interconnects a controller 326, including a memory 324 and a processor 325, and one or more communications interfaces 314.

The memory 324 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 324 is encoded with logic instructions (e.g., software code) and/or data that form a connection establishment application 321 configured according to embodiments of the invention. In other words, the connection establishment application 321 represents software code, instructions and/or data that represent or convey the processing logic steps and operations as explained herein and that reside within memory or storage or within any computer readable medium accessible to the client device 30.

The processor 325 represents any type of circuitry or processing device such as a central processing unit, microprocessor or application-specific integrated circuit that can access the connection establishment application 321 encoded within the memory 324 over the interconnection mechanism 311 in order to execute, run, interpret, operate or otherwise perform the connection establishment application 321 logic instructions. Doing so forms the data connection process 322. In other words, the connection establishment process 322 represents one or more portions of the logic instructions of the connection establishment application 220 while being executed or otherwise performed on, by, or in the processor 325 within the client device 30.

Those skilled in the art will understand that there can be many variations made to the embodiments explained above while still achieving the same objective of those embodiments and the invention in general.

For example, as described above, the first gateway 34-1 detects a connection characteristic 68 associated with data connection request 44. The first gateway 34-1 also transmits a connection signal 48 to the client device 30 in response to detecting the connection characteristic 68 associated with the data connection request 44 where the connection signal 48 indicates a second gateway 34-2 for establishment of a second tunnel connection 54. In another arrangement, a computerized device associated with the first gateway 34-1, such as a tunnel planner device, performs the detecting and transmitting steps to allow the client device 30 to establish 52 a tunnel connection 54 with the second gateway device 34-2.

In another example, as described above, the client device 30 establishes a first tunnel connection 40 with a first gateway 34-1 and establishes a second tunnel connection 54 with the second gateway 34-2 in response to receiving a connection signal 48 from the first gateway 34-1. In another embodiment, a computerized device associated with the client device 30 performs the tunnel establishment steps. For example, for a VPN connection between the client device 30 and the first gateway 34-1, using an L2TP protocol, a dialup Network Access Server forms the tunnel connection 40, 54 with the first 34-1 or second 34-2 gateways on behalf of the client device 30.

In another example, as described above, the first gateway 34-1 transmits the connection signal 48 to the client device 30 after startup of the first tunnel connection 40. The first gateway device 34-1, however, can transmit the connection signal 48 to the client device 30 at periodic intervals, either before or after startup of the first tunnel connection 40. Such transmission allows the first gateway 34-1 to provide the client device with updated information relative to appropriate second gateways 34-2 for establishment of tunnel connections 40, 54.

In another example, as described above, the tunnel connection 40 includes a VPN connection between the client device 30 and the second network 38 established using a VPN tunneling protocol such as IPSec, L2TP, PPTP, or GRE. PPTP, IPSec, GRE, and L2TP, operate on a packet-by-packet basis, with the tunnel manager 90 associated with the client 30 possibly dividing the traffic across different tunnels based upon a metric, such as TCP connections or traffic type (e.g., as indicated by the packets), for example. The tunnel manager, therefore, receives packets individually and detects an association between particular packets and particular data connections or flows. From such a determination, the tunnel manager determines an appropriate tunnel 40, 54 to direct the packets based upon the data connection associated with the packet.

In another arrangement, the client 30 establishes the tunnel connection 40 using Secure Sockets Layer (SSL) or Secure Shell (SSH). When using SSL or SSH as the tunnel transport, by contrast to PPTP, IPSec, GRE and L2TP, the tunnel manager associated with the client 30 receives entire HTTP transactions or TCP connection requests and determines the appropriate tunnel 40, 54 to use for that particular transaction of the TCP connection. The tunnel manager of the client 30 does not need to detect an association between particular packets and particular data flows.

In the case of SSL, for example, assume the client device 30 is configured with an SSL-capable browser and includes mechanisms such as Javascript and the "Proxy Autoconfig (proxy.pac)." An SSL-based gateway 34-1 provides to the client 30 (e.g., SSL-capable browser on the client 30) a proxy-selection script that directs the client browser to use different SSL-based proxies (e.g., gateways 34) for different private network destinations 36 (web servers).

In another example, as described above, the client device 30 transmits 46 a data connection request 44-1 to the first gateway 34-1 through a first tunnel connection 40 to request establishment of a first data connection 86-1 with a destination device 36-M. The client device 30 receives a connection signal 48 from the first gateway 34-1 in response to detection 70, by the first gateway 34-1, of a connection characteristic 68 associated with the data connection request 44-1. The client device 30 establishes 52 a second tunnel connection 54 with the second gateway 34-2 in response to receiving 50 the connection signal 48.

In another arrangement, the client device 30 establishes the second tunnel connection 54 with the second gateway 34-2 based upon an examination, by the client device 30, of a connection characteristic 68 associated with the data connection request 44-1. For example, assume the client device 30, after establishing the first tunnel connection 40 with the first gateway 34-1, generates a data connection request 44-1. In the present arrangement, prior to transmitting the data connection request 44-1 to the first gateway 34-1, the client device examines a connection characteristic 68 associated with the data connection request 44-1. For example, a tunnel manager 90 associated with the client device 30 intercepts the data connection request 44-1, prior to the client device 30 transmitting the request 44-1 to the first gateway 34-1, and examines the connection characteristic 68 of the data connection request 44-1 where the connection characteristic indicates the type of data requested or destination of the data request, for example. Based upon the results of the examination (e.g., based upon the type of data requested or destination of the data request), the client-side tunnel manager 90 causes the client device 30 to establish a second tunnel connection 54 with the second gateway 34-2. In such an arrangement, the client device 30 bypasses the first gateway 34-1 in establishing a second tunnel connection with a second gateway 34-2.

In another example, as described above, after the client device 30 establishes the second tunnel connection 54 with the second gateway 34-2, the client device monitors a data characteristic of data to be transmitted through a tunnel connection to ensure that the client device 30 transmits the data through the appropriate tunnel. In another arrangement, as illustrated in FIG. 5, the client device 30 maintains multiple tunnel connections 40, 54-1, 54-2 with corresponding, multiple gateway devices 34-1, 34-2, 34-N. In order to transmit data or data traffic 90 through an appropriate tunnel 40, 54-1, 54-2 (e.g., a tunnel connection configured to carry a particular type, amount, or destination for the data traffic), the client device 30 detects a cost estimate 92 for the traffic data 90 for transmission to a gateway device 34-1, 34-2, 34-N. The client device 30 detects the cost estimate 92 based upon a metric 94 of the traffic data 90. The metric includes the type of traffic data (e.g., text file, audio file, or video file), amount of traffic data (e.g., size of the traffic data), or destination of traffic data. The client device 30 assigns the traffic data 90 to a tunnel connection 40, 54-1, 54-2 based upon the cost estimate for the traffic data 90. In such an arrangement, the client device 30 dynamically appropriates traffic data 90 among tunnel connections to device optimize the overall total network path for communications between the client device 30 and the destination. Furthermore, in such an arrangement, the client device optimizes the overall performance of the data communications system 20 including by optimizing latency, throughput, and internal 38 and external 32 network costs within the system 20.

Such variations are intended to be covered by the scope of this invention. As such, the foregoing description of embodiments of the invention is not intended to be limiting. Rather, any limitations to the invention are presented in the following claims.

What is claimed is:

1. A computerized device, comprising:
   at least one communications interface;
   a controller; and
   an interconnection mechanism coupling the at least one communications interface and the controller;
   where the computerized device:
   establishes a first tunnel connection with a first gateway;
   transmits a first data connection request to the first gateway through the first tunnel connection, the first data connection request requesting establishment of a data connection with a destination device;
   receives a notification from the first gateway that the first gateway detected a connection characteristic associated with the data connection request;
   establishes a plurality of data connections with the destination device through the first tunnel connection with the first gateway upon receiving the notification;
   receives a connection command from the first gateway, the connection command directing the computerized device to establish a second tunnel connection with a second gateway, where the second gateway was chosen by the first gateway based, at least in part, on the connection characteristic;
   establishes a second tunnel connection with the second gateway in response to receiving the connection command;
   transmits a second data connection request to the second gateway through the second tunnel connection, the second data connection request requesting establishment of a data connection with the destination device;
   establishes a data connection with the destination device through the second tunnel connection; and
   maintains the first tunnel connection and the plurality of data connections with the destination device upon establishing the data connection with the destination device through the second tunnel connection and determining that a member of the plurality of data connections through the first tunnel connection is an application level session connection that cannot be interrupted.

2. The computerized device of claim 1, where the computerized device:
   receives, from the first gateway, a connection profile having an address for a second gateway; and
   detects, based upon the connection profile received from the first gateway, the address for a second gateway for establishment of the second tunnel connection with the second gateway.

3. The computerized device of claim 1, where the computerized device:
   establishes the first tunnel connection in a first session;
   stores the connection command within a storage location; and
   when establishing the second tunnel connection:
   deconstructs the first tunnel connection of the first session,
   retrieves the connection command from the storage location, and
   establishes the second tunnel connection in a second session, the second tunnel connection being based upon the connection command.

4. The computerized device of claim 1, where the computerized device deconstructs the first tunnel connection with the first gateway after establishing the second tunnel connection.

5. The computerized device of claim 1, where the computerized device:
   in response to receiving the notification, establishes a data connection between the client device and the destination device through the first tunnel connection, the data connection for transmission of a particular type of data;
   in response to establishing the second tunnel connection, maintains the first tunnel connection at least while the data connection through the first tunnel connection is active; and
   for a subsequent transmission of the particular type of data, establishes a data connection through the second tunnel connection, the data connection for transmission of the particular type of data.

6. In a first gateway, a method for directing a tunnel connection between a client device and a second gateway, the method comprising:
   establishing a first tunnel connection with the client device;
   monitoring a connection characteristic associated with a data connection request transmittal from the client device;
   permitting establishment of a plurality of data connections from the client device to a destination device through the first tunnel connection upon detecting the connection characteristic associated with the data connection request;
   transmitting, to the client device, a connection command, the connection command directing the client device to establish a second tunnel connection with a second gateway; and
   maintaining the first tunnel connection and the plurality of data connections between the client device and the destination device upon determining that the client device established the second tunnel connection with the second gateway and detecting that an existing data connection of the plurality of data connections through the first tunnel connection is an application level session connection that cannot be interrupted.

7. The method of claim 6, comprising:
   determining that the client device established the second tunnel connection with the second gateway; and
   in response, deconstructing the first tunnel connection.

8. The method of claim 6 comprising:
   in response to detecting the connection characteristic, permitting establishment of a plurality of data connections, through the first tunnel connection, from the client device to the destination device.

9. A computerized device, comprising:
   at least one communications interface;
   a controller; and
   an interconnection mechanism coupling the at least one communications interface and the controller;
   wherein the computerized device:
   establishes a first tunnel connection with a client device;
   monitors a connection characteristic associated with a data connection request transferred from the client device;

permitting establishment of a plurality of data connections from the client device to a destination device through the first tunnel connection upon detecting the connection characteristic associated with the data connection request;

transmits, to the client device, a connection command, the connection command directing the client device to establish a second tunnel connection with a second gateway; and maintains the first tunnel connection and the plurality of data connections between the client device and the destination device upon determining that the client device established the second tunnel connection with the second gateway and detecting that an existing data connection of the plurality of data connections through the first tunnel connection is an application level session connection that cannot be interrupted.

10. A method, comprising:

establishing a first tunnel connection from a client device to a first gateway;

establishing a plurality of data connections, through the first tunnel connection with the first gateway, from the client device to a destination device, where the plurality of data connections depend, at least in part, on a connection characteristic;

transmitting a first data connection request from the client device to the first gateway through the first tunnel connection, the first data connection request requesting establishment of a data connection between the client device and the destination device;

receiving, at the client device, a connection command from the first gateway, the connection command directing the client device to establish a second tunnel connection with a second gateway, where the second gateway was chosen by the first gateway based, at least in part, on a detection of a connection characteristic associated with the first data connection request;

establishing a second tunnel connection with a second gateway in response to receiving the connection command;

transmitting a second data connection request from the client device to the second gateway through the second tunnel connection, the second data connection request requesting establishment of a data connection with the destination device;

establishing a data connection between the client device and the destination device through the second tunnel connection; and in response to establishing the data connection between the client device and the destination device through the second tunnel connection, detecting that an existing data connection of the plurality of data connections through the first tunnel connection is an application level session connection that cannot be interrupted; and in response, maintaining the first tunnel connection between the client device and the first gateway, such that the plurality of data connections between the client device and the destination device through the first tunnel connection are also maintained.

11. In a first gateway, a method for directing a tunnel connection between a client device and a second gateway, the method comprising:

Establishing a first tunnel connection with the client device;

monitoring a connection characteristic associated with a data connection request transmittal from the client device;

detecting the connection characteristic associated with the data connection request;

in response to detecting the connection characteristic, permitting establishment of a plurality of data connections, through the first tunnel connection, from the client device to a destination device;

transmitting, to the client device, a connection command, the connection command directing the client device to establish a second tunnel connection with a second gateway;

determining that the client device established the second tunnel connection with the second gateway;

in response, detecting that an existing data connection of the plurality of data connections through the first tunnel connection is an application level session connection that cannot be interrupted; and in response, maintaining the first tunnel connection such that the plurality of data connections between the client device and the destination device through the first tunnel connection are also maintained.

12. A computerized device, comprising:

at least one communications interface;

a controller; and an interconnection mechanism coupling the at least one communications interface and the controller;

where the computerized device:

establishes a first tunnel connection with a client device;

monitors a connection characteristic associated with a data connection request transferred from the client device;

detects the connection characteristic associated with the data connection request; and transmits, to the client device, a connection command, the connection command directing the client device to establish a second tunnel connection with a second gateway in response to detecting the connection characteristic, permits establishment of a plurality of data connections, through the first tunnel connection, from the client device to a destination device;

determines that the client device established the second tunnel connection with the second gateway;

in response, detects an existing data connection of the plurality of data connections through the first tunnel connection is an application level session connection that cannot be interrupted; and in response, maintains the first tunnel connection such that the plurality of data connections between the client device and the destination device through the first tunnel connection are also maintained.

* * * * *